US008020247B2

(12) United States Patent
Katou et al.

(10) Patent No.: US 8,020,247 B2
(45) Date of Patent: Sep. 20, 2011

(54) WIPER SYSTEM

(75) Inventors: Atsushi Katou, Toyohashi (JP); Eiji Ina, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 755 days.

(21) Appl. No.: 12/081,322

(22) Filed: Apr. 15, 2008

(65) Prior Publication Data

US 2008/0301898 A1 Dec. 11, 2008

(30) Foreign Application Priority Data

Jun. 8, 2007 (JP) ................................ 2007-152929
Feb. 28, 2008 (JP) ................................ 2008-048081

(51) Int. Cl.
*B60S 1/58* (2006.01)

(52) U.S. Cl. ................ 15/250.3; 15/250.31; 15/250.001

(58) Field of Classification Search ................. 15/250.3, 15/250.31, 250.001, 250.16, 250.19; 296/180.1, 296/146.8, 156, 152; *B60S 1/58*
See application file for complete search history.

(56) References Cited

U.S. PATENT DOCUMENTS 1,666,107 A * 4/1928 Phillips, Jr. ................ 15/250.16
5,564,157 A * 10/1996 Kushida et al. .......... 15/250.201
5,565,157 A * 10/1996 Sugimoto et al. ............. 264/101
2007/0200389 A1* 8/2007 Ina et al. .................... 296/180.1
2007/0235549 A1* 10/2007 Nakajima .................. 236/44 R

FOREIGN PATENT DOCUMENTS

JP H07-39734 9/1995
JP A-2002-370626 12/2002

OTHER PUBLICATIONS

U.S. Appl. No. 11/706,183, filed Feb. 15, 2007, Ina et al.

* cited by examiner

*Primary Examiner* — Monica S Carter
*Assistant Examiner* — Michael Jennings
(74) *Attorney, Agent, or Firm* — Posz Law Group, PLC

(57) ABSTRACT

A rear spoiler includes a depth end wall, which bounds an accommodation space, which accommodates a wiper blade upon positioning of the wiper blade in a stop position. A distance between the depth end wall and the wiper blade in the stop position measured in a direction generally parallel to a surface of a window glass, which is wiped by the wiper blade, is set such that the distance between the depth end wall and a first longitudinal side of the wiper blade, which is opposite from the pivot axis, is larger than the distance between the depth end wall and a second longitudinal side of the wiper blade, which is opposite from the first longitudinal side of the wiper blade.

12 Claims, 9 Drawing Sheets

1 IV 33 5 20 A 10 33 4 2 3 6 34 IV 34 W

10 S2 22a 34c S1 21 21a 34a 34 20a 34b 33

1
A
10
2
3
4
34
33
20
5
33
W
IV
IV
34
6

WIPER SYSTEM

CROSS REFERENCE TO RELATED APPLICATION

This application is based on and incorporates herein by reference Japanese Patent Application No. 2007-152929 filed on Jun. 8, 2007 and Japanese Patent Application No. 2008-048081 filed on Feb. 28, 2008.

BACKGROUND OF THE INVENTION

1. Field of the Invention

The present invention relates to a wiper system.

2. Description of Related Art

For example, Japanese Utility Model Publication No. H07-39734 discloses a roof spoiler (a wiper system), which includes a wiper mechanism that wipes a surface of a rear window glass of a vehicle. The above roof spoiler is installed to a top end portion of the back door panel or a rear end portion of a roof panel and receives the wiper mechanism that wipes the rear window glass.

Furthermore, Japanese Unexamined Patent Publication No. 2002-370626 discloses another technique. According to the disclosed technique, a recess, which is recessed inward of a vehicle, is provided in a top portion of a back door panel of the vehicle, and a rear wiper motor apparatus is installed in this recess. Upon installation of the rear wiper motor apparatus in the recess, an outer panel (a rear spoiler) is installed.

FIG. 11 is a descriptive view of a previously proposed wiper system, which should be only considered as an illustrative comparative example for illustrating advantages of the present invention. As shown in FIG. 11, the previously proposed wiper system includes an accommodation space 120*a*, which is formed in a spoiler 110 to accommodate a wiper arm 133 and a wiper blade 134.

In the previously proposed wiper system, the wiper blade 134 is accommodated in the accommodation space 120*a* of the spoiler 110 when the wiper blade 134 is placed in a stop position thereof. Thus, for example, at the time of snowfall, the snow, which is wiped by the wiper blade 134, is wiped into the accommodation space 120*a* and is accumulated therein.

Normally, a wiping surface area size of the wiper blade 134 is increased from a pivot axis side 134*b* of the wiper blade 134 to a distal end side 134*a* of the wiper blade 134 in conformity with an increase in a length of an arcuate wiping path of the wiper blade 134 along the length of the wiper blade 134. Thus, the amount of snow, which is wiped by the wiper blade 134 at the time of snowfall is larger at the distal end side 134*a* in comparison to the pivot axis side 134*b*. Therefore, one longitudinal side of the accommodation space 120*a*, which accommodates the distal end side 134*a*, tends to accumulate the larger amount of snow in comparison to the other longitudinal side of the accommodation space 120*a*, which accommodates the pivot axis side 134*b*.

However, in the previously proposed wiper system, a depth of the accommodation space 120*a* is made generally constant along the length of the accommodation space 120*a* regardless of the location along the length of the wiper blade 134. Specifically, as shown in FIG. 11, a distance S1 between the distal end side 134*a* of the wiper blade 134 and a depth end wall 122*a* is generally the same as a distance S2 between the pivot axis side 134*b* and the depth end wall 122*a*.

Thus, while the other longitudinal side of the accommodation space 120*a*, which accommodates the pivot axis side 134*b* of the wiper blade 134, may have a sufficient space for accumulating the wiped objects (e.g., snow), the one longitudinal side of the accommodation space 120*a*, which accommodates the distal end side 134*a* of the wiper blade 134, may not have sufficient space for accommodating the wiped objects. When the accommodation space 120*a* accumulates the large amount of the wiped objects, the distal end side 134*a* of the wiper blade 134 tends to be caught by the wiped objects, and thereby causing a damage to the wiper blade 134 or locking of the wiper motor apparatus upon continuation of the wiping operation due to the capturing of the wiper blade 134 in the wiped objects.

SUMMARY OF THE INVENTION

The present invention addresses at least one of the above disadvantages.

According to one aspect of the present invention, there is provided a wiper system for a vehicle. The wiper system includes a wiper blade and a spoiler. The wiper blade is reciprocally pivotable about a pivot axis thereof to wipe a surface of a window glass of the vehicle. The spoiler projects from a surface of a body of the vehicle and has an accommodation space, which accommodates the wiper blade upon positioning of the wiper blade in a stop position. The spoiler includes a depth end wall, which bounds the accommodation space and protrudes in a direction generally perpendicular to the surface of the window glass. The accommodation space has an opening on a side, which is opposite from the depth end wall in a direction generally parallel to a front-to-rear direction of the vehicle, to move the wiper blade into and out of the accommodation space. A distance between the depth end wall and the wiper blade in the stop position measured in a direction generally parallel to the surface of the window glass is set such that the distance between the depth end wall and a first longitudinal side of the wiper blade, which is opposite from the pivot axis, is larger than the distance between the depth end wall and a second longitudinal side of the wiper blade, which is opposite from the first longitudinal side of the wiper blade.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
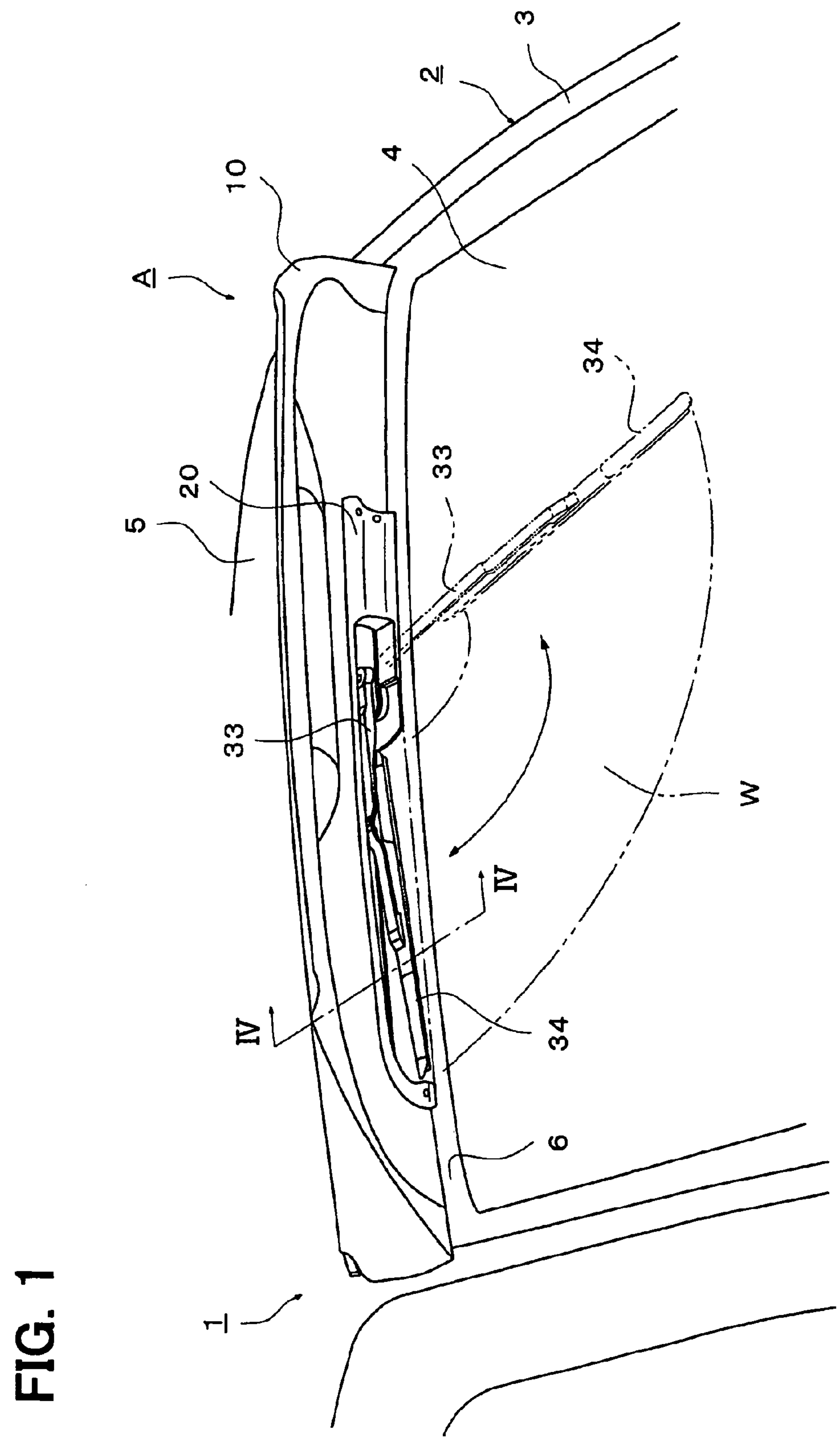
FIG. 1 is perspective rear view of a vehicle, to which a wiper system of a first embodiment of the present invention is installed.

In a first embodiment of the present invention, a wiper system A is placed at a top end of a back door 2 of a vehicle 1. As shown in FIG. 1, the vehicle 1 includes the back door 2, which has a rear window glass (hereinafter, simply referred to as a glass) 4 that is installed in a door main body 3. The wiper system A is placed around the top end of the glass 4. Furthermore, a ceramic line (serving as a printed portion) 6 is printed on an interior side (a passenger room side) of the glass 4. Although the wiper system A of the present embodiment is placed at the top end of the backdoor 2, the window system A may be alternatively placed at a rear end of a roof 5 of the vehicle.

The wiper system A includes a spoiler main body 10, a spoiler base 20 and a wiper (a wiper arm 33, a wiper blade 34) as main components thereof. The spoiler main body 10 is fixed to project from a surface of a body of the vehicle 1. The spoiler base 20 is placed in a base accommodation space 10*a* (see FIG. 2) of the spoiler main body 10. The wiper is placed rotatable to the spoiler base 20. The spoiler main body 10 and the spoiler base 20 serve as a spoiler of the present invention.

The wiper system A of the present embodiment functions as a rear spoiler, at which the spoiler main body 10 rectifies an air flow, which is created around a rear end of the vehicle 1 during traveling of the vehicle 1. Furthermore, the wiper system A functions as a rear wiper system, which wipers a wiping area W on a surface of the glass 4 by reciprocally driving the wiper arm 33 and the wiper blade 34.

The wiper arm 33 and the wiper blade 34 are installed such that the wiper arm 33 and the wiper blade 34 can be moved into and out of the wiper accommodation space 20*a* through an opening 21*a*. In a wiper non-operational state (stopped state or parked state), the wiper arm 33 and the wiper blade 34 are accommodated in the wiper accommodation space 20*a*. The wiper accommodation space 20*a* is deepened into the base accommodation space 10*a* of the spoiler main body 10. Thus, in the wiper non-operational state, the wiper arm 33 and the wiper blade 34 are less likely visibly exposed at the vehicle rear end side, thereby implementing a good appearance of the wiper system A.

Furthermore, a color of the wiper arm 33 and a color of the wiper blade 34 may be made the same or similar color as that of the spoiler base 20. In this way, the wiper arm 33 becomes less noticeable in the wiper non-operational state.

Next, the wiper system A will be described in detail.

Figure 2:
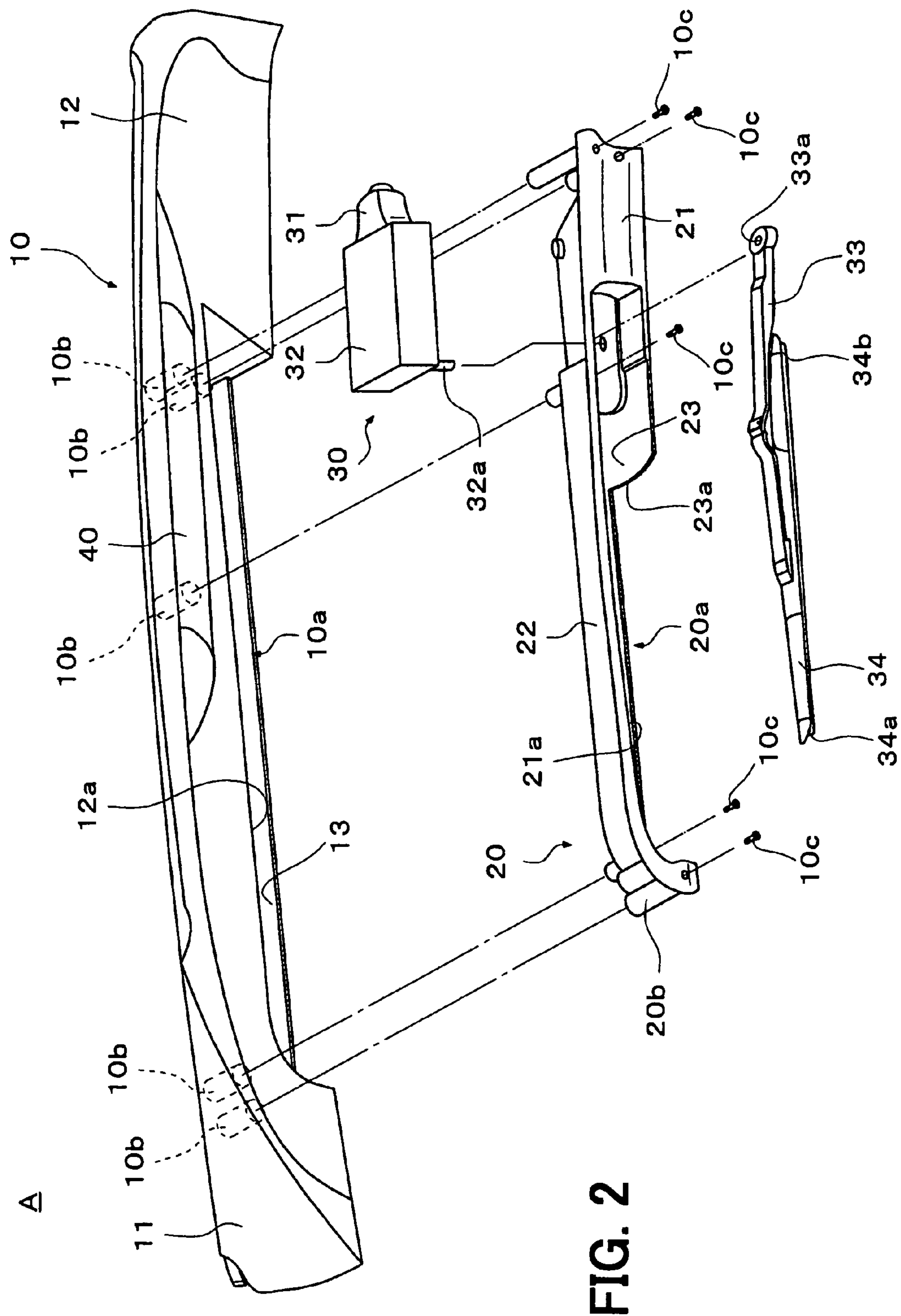
FIG. 2 is an exploded perspective view of the wiper system.

As shown in FIG. 2, the spoiler main body 10 of the present embodiment is a hollow body, which is made of, for example, a resin material. The spoiler main body 10 includes a rectifying portion 11, a rear surface portion 12 and a fixing portion 13. After installation to the vehicle 1, the rectifying portion 11 protrudes from the roof 5 in a direction generally perpendicular to the roof 5 and extends toward a left side and a right side from a top center of the vehicle 1 generally in a horizontal direction. The rear surface portion 12 projects obliquely downward from a rear end portion (a distal end portion) of the rectifying portion 11 to a location near the top end portion of the glass 4. The fixing portion 13 is configured into a plate body that is formed continuously from the rectifying portion 11 and the rear surface portion 12 and contacts the surface of the body of the vehicle 1.

The base accommodation space 10*a*, which is defined by the rectifying portion 11, the rear surface portion 12 and the fixing portion 13, is formed in the interior of the spoiler main body 10. Furthermore, a high mount stop lamp 40, which functions as an auxiliary brake lamp, is installed at a center distal end part of the rear surface portion 12.

An accommodation opening 12*a* is formed in the rear surface portion 12, which is formed as an opening of a rectangular recess that is elongated generally in a transverse direction (a width direction) of the vehicle 1, which is perpendicular to a front-to-rear direction of the vehicle. The accommodation opening 12*a* is formed at a corresponding location of the rear surface portion 12, which is placed adjacent to the glass 4 upon fixation of the spoiler main body 10 to the vehicle 1, and the accommodation opening 12*a* communicates between an outer side (glass 4 side) and an inner side (the base accommodation space 10*a* side).

A plurality (five in this embodiment) of main body side connectors 10*b* is formed in the interior of the base accommodation space 10*a*. Each main body side connector 10*b* is formed as a boss that projects from an interior surface of the rectifying portion 11 toward the accommodation opening 12*a*. Furthermore, each main body side connector 10*b* has a threaded screw hole, which extends in a longitudinal direction of the main body side connector 10*b*. The main body side connectors 10*b* are used to fix the spoiler base 20 to the spoiler main body 10 with screws 10*c*.

The spoiler base 20 is provided to fix a wiper motor apparatus 30 described below and the wiper (wiper arm 33, the wiper blade 34). The spoiler base 20 of the present embodiment includes a closure portion (a closure wall) 21, a recessed portion (a recessed wall) 22 and a bottom surface portion 23. An outer shape of the closure portion 21 is slightly larger than a contour line of the accommodation opening 12*a*. The recessed portion (recessed wall) 22 is bulged from the opening 21*a* of the closure portion 21 toward a front side of the vehicle 1. The bottom surface portion 23 is formed continuously from a bottom surface of the closure portion 21.

A notched portion 23*a* is formed at the opening 21*a* side of the bottom surface portion 23 as a generally rectangular notch (recess) that extends in the transverse direction of the vehicle 1. In the present embodiment, a wiper stop position (a wiper stop location) is provided in an area, which is defined by the notched portion 23*a*. In the wiper non-operational state, the wiper blade 34 is held in this area defined by the notched portion 23*a*. Therefore, at the time of stopping the wiper at the stop position, a wiper strip (a blade rubber) 34*d* of the wiper blade 34 is not forcefully moved from the glass 4 onto the bottom surface portion 23. As a result, it is possible to limit generation of noisy sound, which would be otherwise generated by forcefully moving the wiper strip onto the bottom surface portion 23.

A plurality (five in the present embodiment) of base side connectors 20*b* is formed at a rear surface side of the closure portion 21 of the spoiler base 20. The base side connectors 20*b* are formed at corresponding locations, respectively, which contact the main body side connectors 10*b*, respectively, at the time of installing the spoiler base 20 to the spoiler main body 10. Each base side connector 20*b* has a threaded screw hole that extends in a longitudinal direction of the base side connector 20*b*. A corresponding one of the screws 10*c* is threaded into each threaded screw hole of the base side connector 20*b* and the threaded screw hole of the corresponding main body side connector 10*b* to join therebetween, so that the spoiler base 20 is fixed to the spoiler main body 10.

When the spoiler base 20 is installed to the spoiler main body 10, a surface of the closure portion 21 is generally flush with the surface (glass 4 side surface) of the rear surface portion 12, and the recessed portion 22 is accommodated into the base accommodation space 10*a*. Furthermore, the outer shape of the closure portion 21 is formed slightly larger than the shape defined by the contour line of the accommodation opening 12*a*. Thus, when the spoiler base 20 is installed to the spoiler main body 10, no substantial gap is formed between the closure portion 21 and the rear surface portion 12, thereby providing an integral appearance.

Furthermore, when the spoiler base 20 is installed to the spoiler main body 10, the recessed portion 22 is entirely accommodated into the base accommodation space 10*a*, and the closure portion 21 partitions between the inside and the outside of the base accommodation space 10*a*. As discussed above, the base accommodation space 10*a* is partitioned by the closure portion 21, so that intrusion of the foreign objects (e.g., rain water, dust, debris) into the inside of the base accommodation space 10*a* is limited, thereby implementing the high water proof performance and the high dust proof performance.

The area, which is defined by the inner wall surface of the recessed portion 22, forms the wiper accommodation space 20*a*. The wiper accommodation space 20*a* is a space, which accommodates and holds the wiper (the wiper arm 33, the wiper blade 34).

The wiper motor apparatus 30 is fixed to the spoiler base 20. The wiper arm 33 is rotatably connected to the wiper motor apparatus 30, and the wiper blade 34 is installed to a distal end portion of the wiper arm 33.

The wiper motor apparatus 30 includes an electric motor unit 31 and a speed reducing mechanism 32. A pivot shaft 32*a*, which projects downward, is connected to the speed reducing mechanism 32, and a base end portion 33*a* of the wiper arm 33 is fixed to the pivot shaft 32*a*, a pivot axis of which serves as a pivot axis of the wiper blade 34. The speed reducing mechanism 32 reduces a speed of one way rotation of the electric motor unit 31 and converts the one way rotation of an output shaft 31*a* of the electric motor unit 31 into a reciprocal pivotal movement within a predetermined angular range to reciprocally swing the wiper arm 33.

The wiper blade 34 is supported by the distal end portion of the wiper arm 33 and is slidably engaged with the glass 4 to wipe the surface of the glass 4. The wiper blade 34 is an elongated member and includes a cap, which is supported by the wiper arm 33, and the wiper strip, which extends along the cap. One longitudinal end portion of the wiper blade 34, which is closer to the pivot shaft 32*a*, is referred to as a pivot axis side 34*b*, and the other longitudinal end portion of the wiper blade 34, which is opposite from the rotatable shaft 34*b*, is referred to as a distal end side 34*a*. The distal end side 34*a* may also be referred to as a first longitudinal side of the wiper blade 34, and the pivot axis side 34*b* may also be referred to as a second longitudinal side of the wiper blade 34.

Figure 3:
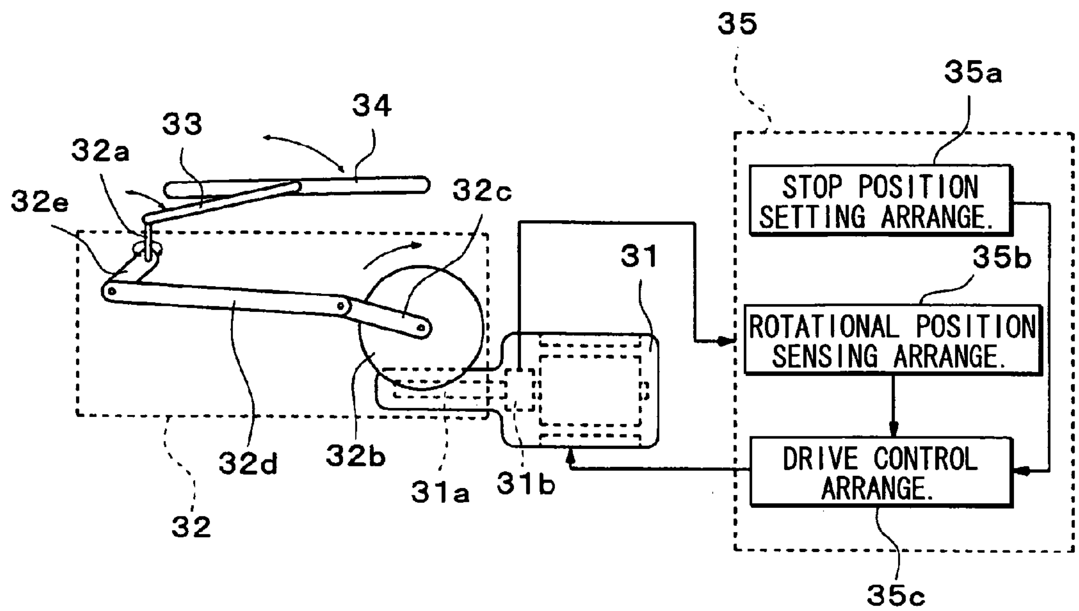
FIG. 3 is a functional block diagram of the wiper system.

As shown in FIG. 3, a rotation output device (a rotational information output device) 31*b*, which is in a form of, for example, a rotary encoder that senses a rotational position, is provided to the output shaft 31*a* of the electric motor unit 31. The rotation output device 31*b* rotates integrally with the output shaft 31*a* and outputs a predetermined number of pulse signals per rotation of the output shaft 31*a*.

The speed reducing mechanism 32 includes a disc gear 32*b*, a link arm 32*c*, a link rod 32*d* and a pivot lever 32*e*.

The disc gear 32*b* includes a gear portion (a toothed portion), which is meshed with an undepicted gear, which is provided to the output shaft 31*a* of the electric motor unit 31. When the output shaft 31*a* of the electric motor unit 31 is rotated, the disc gear 32*b* is rotated in one direction (a direction of an arrow in FIG. 3). One end of the link arm 32*c* is fixed to a rotational axis of the disc gear 32*b*, and the other end of the link arm 32*c* is connected to one end of the link rod 32*d*. The other end of the link rod 32*d* is connected to one end of the pivot lever 32*e*, and the other end of the pivot lever 32*e* is connected to the pivot shaft 32*a*.

When the output shaft 31*a* of the electric motor unit 31 is continuously rotated in one direction, the disk gear 32*b* is rotated in one direction at a rotational speed, which is lower than a rotational speed of the output shaft 31*a*. Since the one end of the link arm 32*c* is fixed to the center of the disc gear 32*b*, the other end of the link arm 32*c* is rotated about the fixed end of the link arm 32*c* along an outer peripheral part of the disc gear 32*b*. The link rod 32*d* is reciprocally moved left and right in FIG. 3 due to the rotation of the link arm 32*c*, so that the pivot lever 32*e* is reciprocally swung about the pivot shaft 32*a* in response to the movement of the link rod 32*d*. Thereby, the pivot shaft 32*a* is pivoted such that the pivot direction of the pivot shaft 32*a* is changed every predetermined angle.

A controller 35, which controls the stop position of the wiper, is electrically connected to the wiper motor apparatus 30. The controller 35 includes a stop position setting arrangement 35*a*, a rotational position sensing arrangement 35*b* and a drive control arrangement 35*c* as its functional units. The stop position setting arrangement 35*a* sets the stop position of the wiper blade 34. The rotational position sensing arrangement 35*b* counts the number of pulses supplied from the rotation output device 31*b* and thereby senses the rotational position of the output shaft 31*a* based on the counted pulses. The drive control arrangement 35*c* drives the electric motor unit 31 based on the stop position, which is set by the stop position setting arrangement 35*a*, and the current rotational position, which is sensed by the rotational position sensing arrangement 35*b*.

The stop position setting arrangement 35*a* has a function of presetting the rotational position of the wiper blade 34 as the rotational position of the rotation output device 31*b*. In the present embodiment, the stop position, which is preset in the stop position setting arrangement 35*a*, is a rotational position, at which the distal end side 34*a* of the wiper blade 34 is directed downward relative to the horizontal direction. Specifically, the rotational position, at which the distal end side 34*a* of the wiper blade 34 is still slightly downwardly away from the horizontal direction on the lower side thereof, is set as the stop position.

The rotational position setting arrangement 35*b* senses the rotational position of the output shaft 31*a* to indirectly obtain the rotational position of the wiper blade 34.

The drive control arrangement 35*c* includes an MPU and compares the sensed rotational position of the wiper blade 34 with the stop position, which is preset in the stop position setting arrangement 35*a*. When the sensed rotational position of the wiper blade 34 coincides with the stop position preset in the stop position setting arrangement 35*a*, the drive control arrangement 35*c* stops supply of the electric power to the electric motor unit 31. In this way, the wiper blade 34 is stopped at the stop position, which is preset in the stop position setting arrangement 35*a*.

The wiper arm 33 includes an undepicted urging member, which urges the wiper blade 34 toward the glass 4 side. The wiper arm 33 of the present embodiment is bent into a hook shape at an intermediate portion of the wiper arm 33 and has a receiving hole, into which the pivot shaft 32*a* of the wiper motor apparatus 30 can be installed, at the base end portion 33*a* of the wiper arm 33.

When a wiper start operation is performed on an undepicted wiper operation switch, the wiper motor apparatus 30 is actuated, so that the wiper arm 33 and the wiper blade 34 are reciprocally swung about the pivot shaft 32*a* along an arcuate path between an upper return position and a lower return position to wipe the surface of the glass 4.

When a wiper stop operation is performed on a wiper stop switch, the wiper motor apparatus 30 stops the reciprocal pivotal movement of the wiper at the preset stop position. The stop control operation of the wiper is executed by the controller 35. The controller 35 obtains the rotational position of the pivot shaft 32*a* from the rotation output device 31*b*. Then, when the controller 35 determines that the wiper blade 34 is in the preset stop position, the controller 35 stops the supply of the electric power to the electric motor unit 31 to stop the reciprocal pivotal movement of the wiper.

In the wiper non-operational state (stopped state), the wiper arm 33 and the wiper blade 34 are held in the wiper accommodation space 20*a*. In the present embodiment, the wiper stop position is the same as the upper return position of the wiper blade 34. Alternatively, the wiper stop position may be set above the upper return position of the wiper blade 34, depending on a need.

At the time of stopping the wiper blade 34, the controller 35 performs the stop control operation such that the distal end side 34*a* of the wiper blade 34 is slightly downwardly direction away from the horizontal direction.

Figure 4:
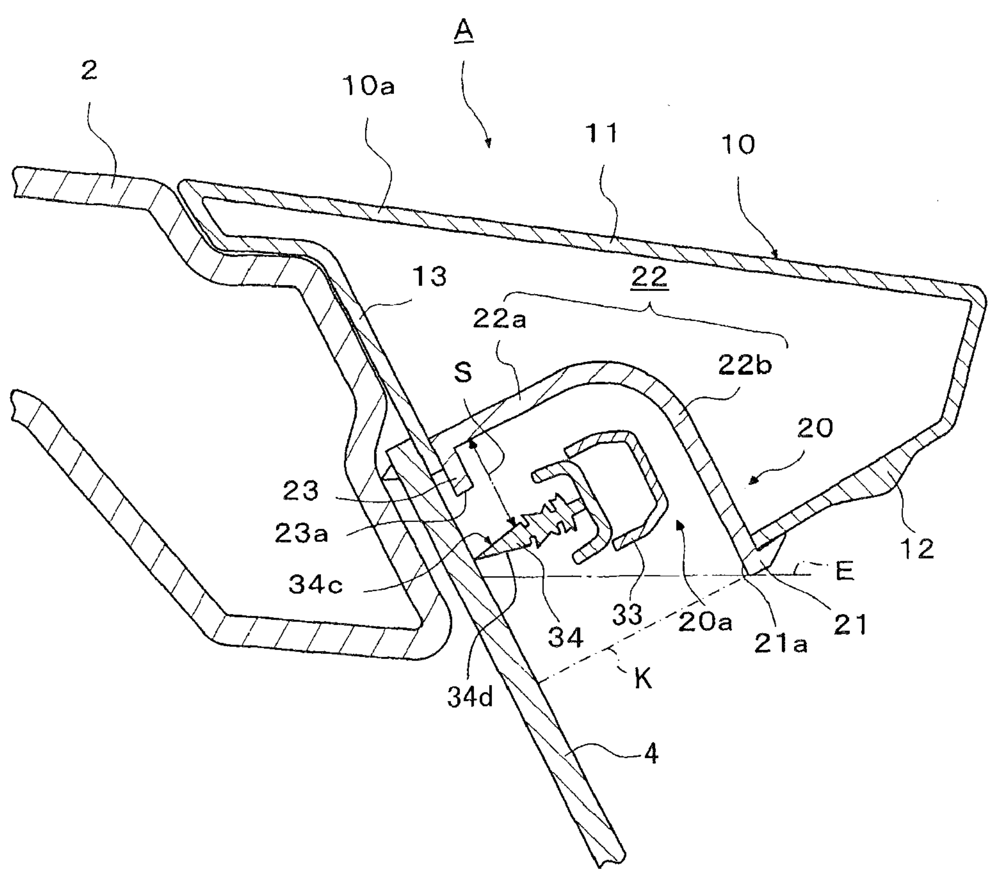
FIG. 4 is a cross sectional view along line IV-IV in FIG. 1.

FIG. 4 is a longitudinal cross sectional view showing the vehicle 1 and the wiper system A in the state where the wiper is accommodated in the wiper accommodation space 20*a*. Furthermore, in FIG. 4, a horizontal straight dot-dash line, which extends along a lower end of the opening 21*a*, is indicated by an end part horizontal line E. Also, a dot-dash line K indicates a boundary of the opening of the wiper accommodation space 20*a* (the opening 21*a* of the closure portion 21), which extends from the opening 21*a* in a direction generally perpendicular to the surface of the glass 4.

As indicated in FIG. 4, the wiper accommodation space 20*a* is defined by a depth end wall 22*a* and a transverse wall 22*b*. The depth end wall 22*a* bounds the accommodation space 20*a* and protrudes in a direction generally perpendicular to the surface of the glass 4. The transverse wall 22*b* is opposed to the surface of the glass 4 in the direction generally perpendicular to the surface of the glass 4 and extends in a direction generally parallel to the transverse direction of the vehicle. The depth end wall 22*a* and the transverse wall 22*b* form inner wall surfaces of the recessed portion 22.

At the stop position of the wiper blade 34, an inner surface of the depth end wall 22*a* of the recessed portion 22 is spaced by a predetermined distance S from an opposed surface 34*c* of the wiper strip 34*d* of the wiper blade 34, which is located on a depth end wall 22*a* side of the wiper strip 34*d* of the wiper blade 34. Here, the distance S between the inner surface of the depth end wall 22*a* and the wiper blade 34 (more specifically, the opposed surface 34*c* of the wiper blade 34) in the stop position is measured in a direction generally parallel to the surface of the glass 4.

Figure 5:
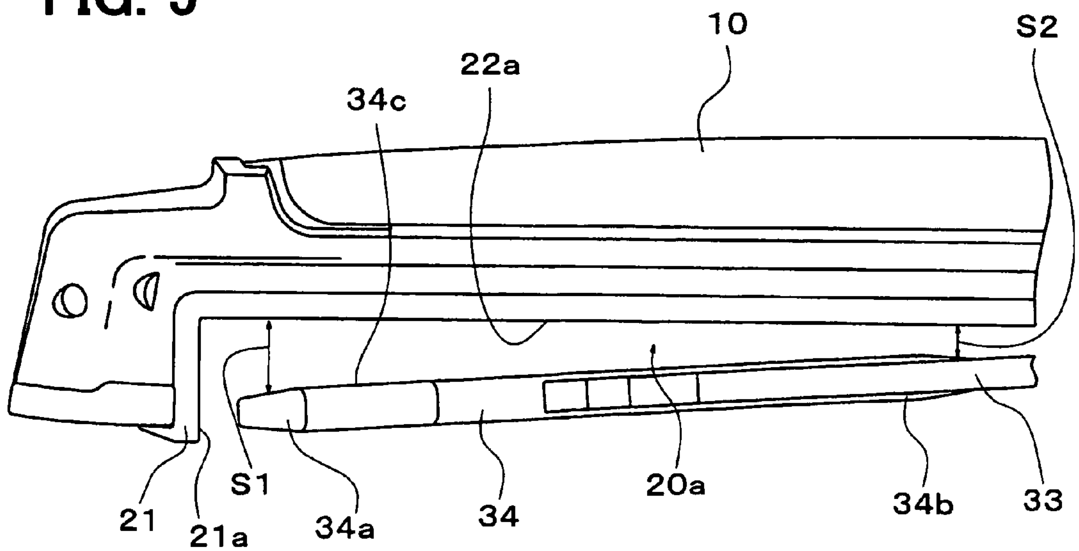
FIG. 5 is a descriptive view showing a distance between a wiper blade and a depth end wall in the wiper system.

FIG. 5 is a rear view showing the wiper system seen from a rear side of the vehicle 1 in the horizontal direction, so that the wiper blade 34 is seen from a top surface side thereof. In FIG. 5, the transverse wall 22*b* is removed to clearly illustrate the distance S. As shown in FIG. 5, the distance S between the depth end wall 22*a* and the opposed surface 34*c* of the wiper blade 34 is progressive increased toward the distal end side 34*a* of the wiper blade 34 and is progressively decreased toward the pivot axis side 34*b* of the wiper blade 34. Specifically, the distance S1 at the distal end side 34*a* is larger than the distance S2 at the pivot axis side 34*b*. In the present embodiment, the depth end wall 22*a* has a linear cross section, so that the distance S proportionally and progressively increases from the pivot axis side 34*b* to the distal end side 34*a* of the wiper blade 34.

When the wiper blade 34 wipes the surface of the glass 4, the wiped objects (e.g., snow, dirt, debris), which are wiped by the wiper blade 34, are accumulated in the wiper accommodation space 20*a*. In the case of the wiper system A of the present embodiment where the top ceiling surface and the lateral surfaces of the wiper accommodation space 20*a* are not opened to the outside, and the wiped objects, which are wiped into the wiper accommodation space 20*a*, have no place to escape, the wiped objects are gradually accumulated in the wiper accommodation space 20*a*.

In general, the amount of the wiped objects, which are wiped by the wiper blade 34, is larger at the distal end side 34*a* of the wiper blade 34 than at the pivot axis side 34*b* of the wiper blade 34. This is due to the following reason. That is, in the case where the curvature of the surface of the glass 4 is constant, the amount of the wiped objects, which are wiped by the wiper blade 34, is increased in proportional to the wiping surface area size of the glass 4, which is wiped by the wiper blade 34. The wiping surface area size in the area along the length of the wiper blade 34 depends on the length of the arcuate travel path (arcuate wiping path) of the wiper blade 34. The position of the pivot shaft 32*a*, which drives the wiper blade 34, is fixed, so that the length L of the arcuate travel path of the wiper blade 34 is expressed by: $L=2\pi r\theta$, where r denotes a radius about the pivot axis of the pivot shaft 32*a*, and θ denotes a rotational angle. Therefore, the length of the arc is proportional to the distance (specifically, the radius r) from the corresponding portion of the wiper blade 34 to the pivot axis of the pivot shaft 32*a*.

In the wiper system A of the present embodiment, the distance S1 at the distal end side 34*a* of the wiper blade 34 is larger than the distance S2 at the pivot axis side 34*b* of the wiper blade 34. That is, the depth of the wiper accommodation space 20*a* is proportional to the amount of the wiped objects, which are wiped by the wiper blade 34.

Thus, the relatively large amount of the wiped objects, which are wiped by the distal end side 34*a* of the wiper blade 34, is accumulated in the one longitudinal side of the wiper accommodation space 20*a*, which has the relatively large distance S and accommodates the distal end side 34*a* of the wiper blade 34. Furthermore, the relatively small amount of the wiped objects, which are wiped by the pivot axis side 34*b* of the wiper blade 34, is accumulated in the other longitudinal side of the wiper accommodation space 20*a*, which has the relatively small distance S and accommodates the pivot axis side 34*b* of the wiper blade 34.

As described above, the depth of the one longitudinal side of the wiper accommodation space 20*a*, which accommodates the distal end side 34*a* of the wiper blade 34, is made relatively large, and the depth of the other longitudinal side of the wiper accommodation space 20*a*, which accommodates the pivot axis side 34*b* of the wiper blade 34, is made relatively small. Therefore, it is possible to provide the appropriate accommodation space, which corresponds to the amount of the wiped objects that are wiped by the wiper blade 34.

Furthermore, as described above, the one longitudinal side of the wiper accommodation space 20*a*, which accommodates the distal end side 34*a*, has the relatively large distance S. Thus, the cross sectional area of the wiper system A in this longitudinal side of the wiper accommodation space 20*a* is relatively large, and thereby the rigidity of the wiper system A can be increased. As a result, even when a relatively large force is applied to the wiper system A, it is possible to limit a damage to the wiper system A.

Furthermore, a wasteful space is reduced in the area of the wiper accommodation space 20_a_, which accommodates the pivot axis side 34_b_, so that it is possible to increase the internal space of the spoiler main body 10. Thereby, it is possible to provide a sufficient space to install the wiper motor apparatus 30 and the other devices in this internal space of the spoiler main body 10.

In the present embodiment, the depth end wall 22_a_ has the planar surface, so that the distance S between the depth end wall 22_a_ and the opposed surface 34_c_ of the wiper blade 34 increases linearly. Alternatively, the depth end wall 22_a_ may have a curved surface, which is curved in a plane parallel to the surface of the glass 4, so that the distance S changes nonlinearly. For example, the depth end wall 22_a_ may have an arcuate surface that has a predetermined curvature. Further alternatively, the depth end wall 22_a_ may have a staircase shape with a plurality of steps along the plane parallel to the surface of the glass 4.

Furthermore, in the present embodiment, the stop position of the wiper blade 34 is set such that the distal end side 34_a_ of the wiper blade 34 is tilted downward from the horizontal direction in the stop position. However, as long as the distance S1 at the distal end side 34_a_ is larger than the distance S2 at the pivot axis side 34_b_, the stop position of the wiper blade 34 may be changed to any other position, which is other than the above oblique position. Also, the distance S may be measured between the depth end wall 22_a_ and any other part of the wiper blade 34, which is other than the opposed surface 34_c_ of the wiper blade 34 (specifically, other than the opposed surface 34_c_ of the wiper strip of the wiper blade 34).

For example, the stop position of the wiper blade 34 may be made such that the distal end side 34_a_ and the pivot axis side 34_b_ of the wiper blade 34 are both generally parallel to the horizontal direction. Alternatively, the stop position of the wiper blade 34 may be made such that the pivot axis side 34_b_ of the wiper blade 34 is directed downward from the horizontal direction. In either case, the wall surface of the depth end wall 22_a_ may be tilted relative to the horizontal direction, so that the distance S1 at the distal end side 34_a_ becomes larger than the distance S2 at the pivot axis side 34_b_.

However, when the distal end side 34_a_ is directed downward relative to the horizontal direction at the stop position of the wiper blade 34, the following advantages can be achieved, so that this stop position is more preferred.

Figure 6A:
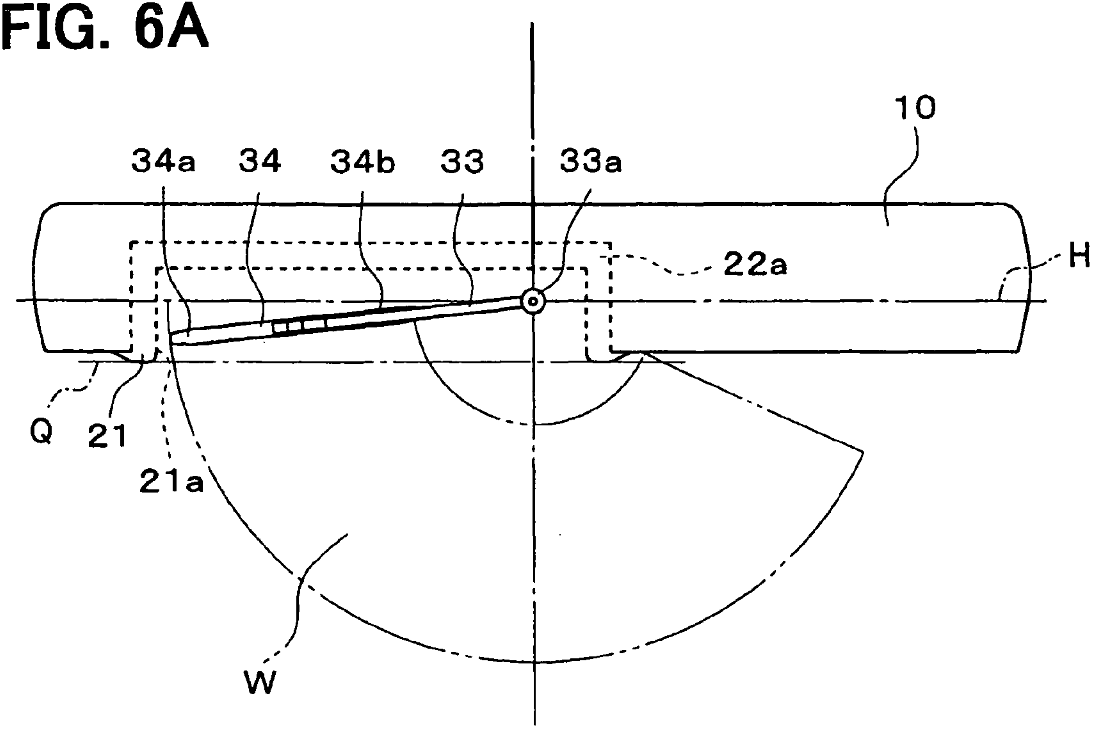
FIGS. 6A and 6B are descriptive views showing two different stop positions, respectively, of the wiper blade.
Figure 6B:
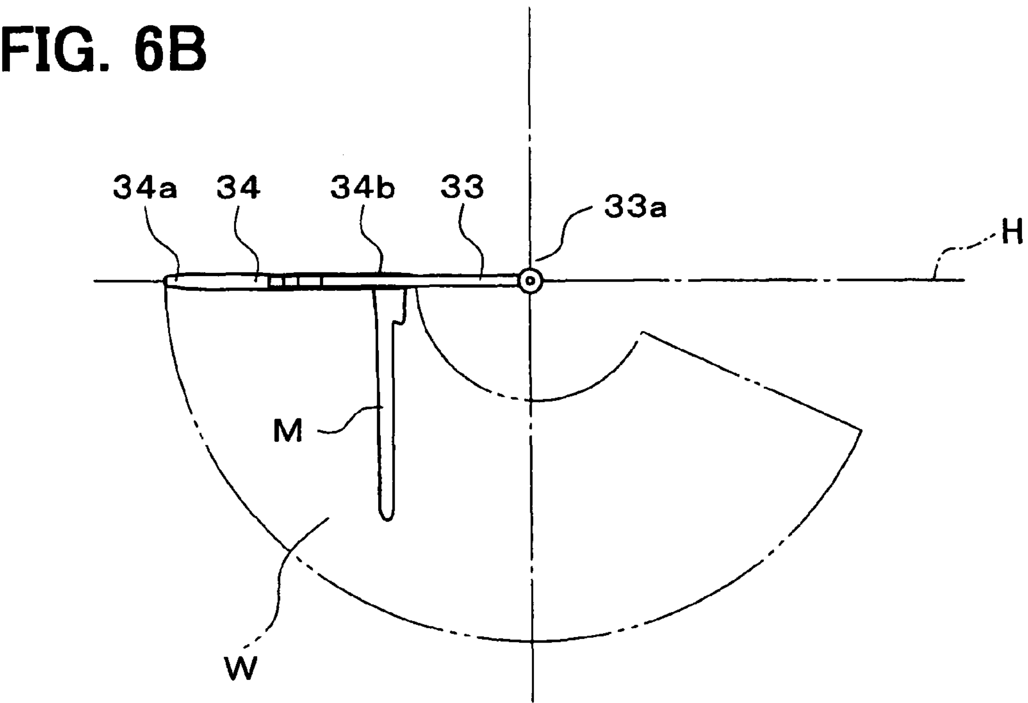

FIG. 6A shows the state where the distal end side 34_a_ of the wiper blade 34 is tilted downward from the horizontal position, i.e., is tilted from the horizontal direction. FIG. 6B shows the state where the distal end side 34_a_ is held in the horizontal position without tilting it.

As shown in FIG. 6A, at the stop position in the wiper accommodation space 20_a_, the wiper blade 34 is stopped such that the distal end side 34_a_ is tilted downward relative to the horizontal direction (a horizontal line H in FIG. 6A). The tilt angle is set to allow flow of water droplets, which adhere to the wiper blade 34, toward the distal end side 34_a_ and is normally set to about 2 to 20 degrees relative to the horizontal line H.

In contrast, as shown in FIG. 6B, when the distal end side 34_a_ is not tilted downward relative to the horizontal direction, foul water M may possibly drip from the pivot axis side 34_b_ onto the wiping area W to foul it. Particularly, in the case where the pivot axis side 34_b_ is tilted downward from the horizontal direction, the water, which adheres to the wiper blade 34, tends to be accumulated in the pivot axis side 34_b_. Thus, the foul water may possibly drip onto the wiping area W.

In the wiper system A of the present embodiment, the distal end side 34_a_ of the wiper blade 34 is tilted downward relative to the horizontal direction in the stop position. Thus, it is possible to limit the dripping of the water (melted snow water in the case of snow), which is wiped by the wiper blade 34, from the pivot axis side 34_b_ of the wiper blade 34 onto the wiping area W upon the stopping of the wiper. Thereby, it is possible to limit the fouling of the wiping area W by, for example, the dripped foul water, which is dripped from the wiper blade 34.

Also, as shown in FIG. 6A, the distal end side 34_a_ of the wiper blade 34 is placed above a transverse horizontal line Q, which extends in a direction that is generally perpendicular to the line K of FIG. 4 generally in the transverse direction of the vehicle parallel to the line H. That is, the distal end side 34_a_ is placed above the lower end (rear end) of the opening 21_a_. In the case where the wiper blade 34 is placed in this position, the wiper blade 34 is hidden into the wiper accommodation space 20_a_ to limit exposure of the wiper blade 34 to the outside when the wiper system A is viewed in the horizontal direction from the rear end side of the vehicle 1. Thus, the outer appearance of the wiper can be improved.

Figure 7:
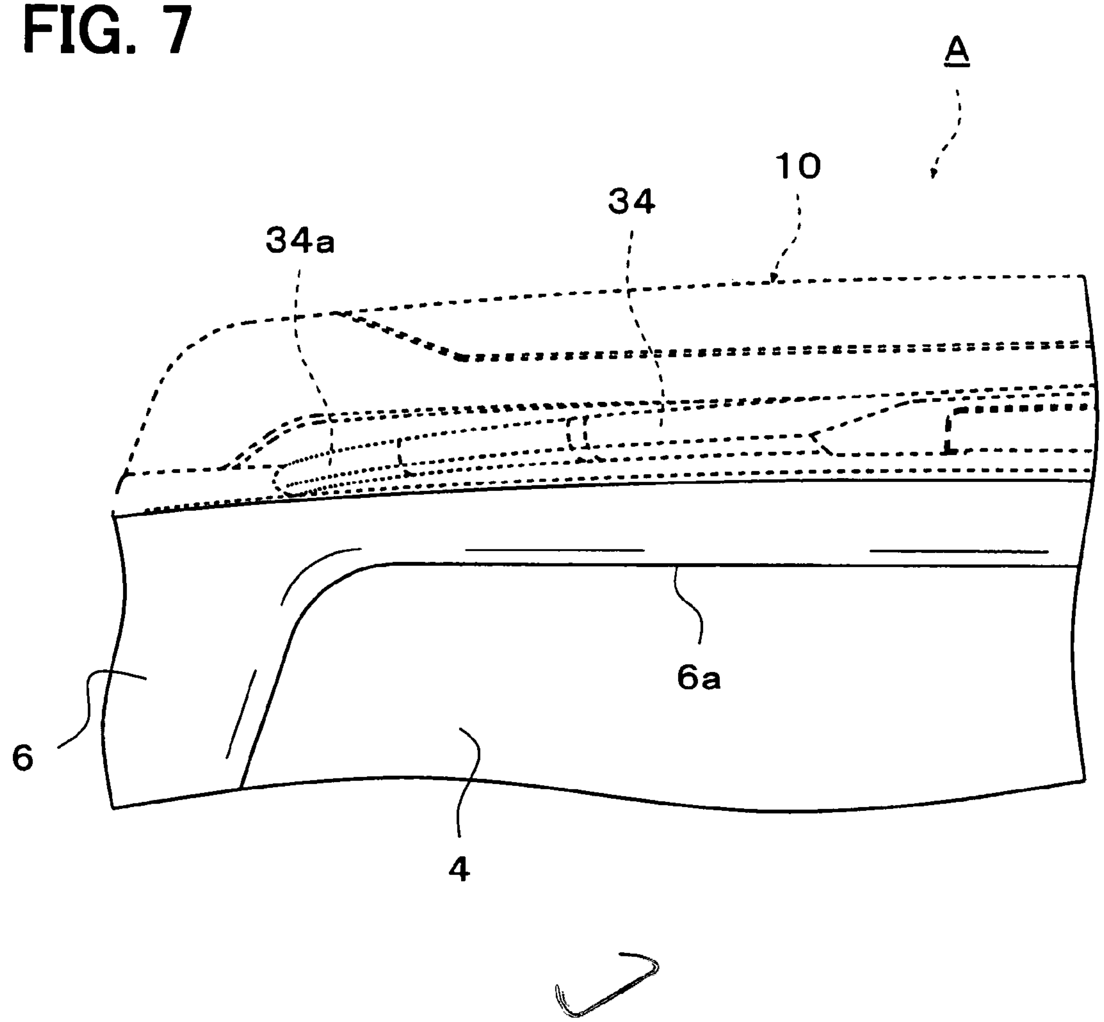
FIG. 7 is a descriptive view of the wiper system viewed from a passenger compartment of a vehicle through a window glass.

Furthermore, as shown in FIG. 7, the stop position of the distal end side 34_a_ of the wiper blade 34 is located above a lower end 6_a_ of a ceramic line 6, which is printed on the glass 4. In the case where the stop position is set in the above described manner, when the wiper system A is viewed from the passenger compartment of the vehicle 1 in the non-operational state of the wiper system A, the wiper blade 34 is not visible from the passenger compartment through the glass 4, thereby improving the rear view of the driver (improving the appearance of the wiper from the passenger compartment side).

Here, it should be noted that the spoiler main body 10 and the wiper blade 34, which are not visible from the passenger compartment, are indicated by a dotted line in FIG. 7 to ease the description.

Second Embodiment

In the first embodiment, the wiper motor apparatus 30, which drives the wiper system, is installed in the spoiler. However, the location of the wiper motor apparatus 30 is not limited to the above described one. For example, the wiper motor apparatus may be installed in the interior of the back door (interior of the body of the vehicle). Hereinafter, this instance will be described as a second embodiment of the present invention.

Figure 8:
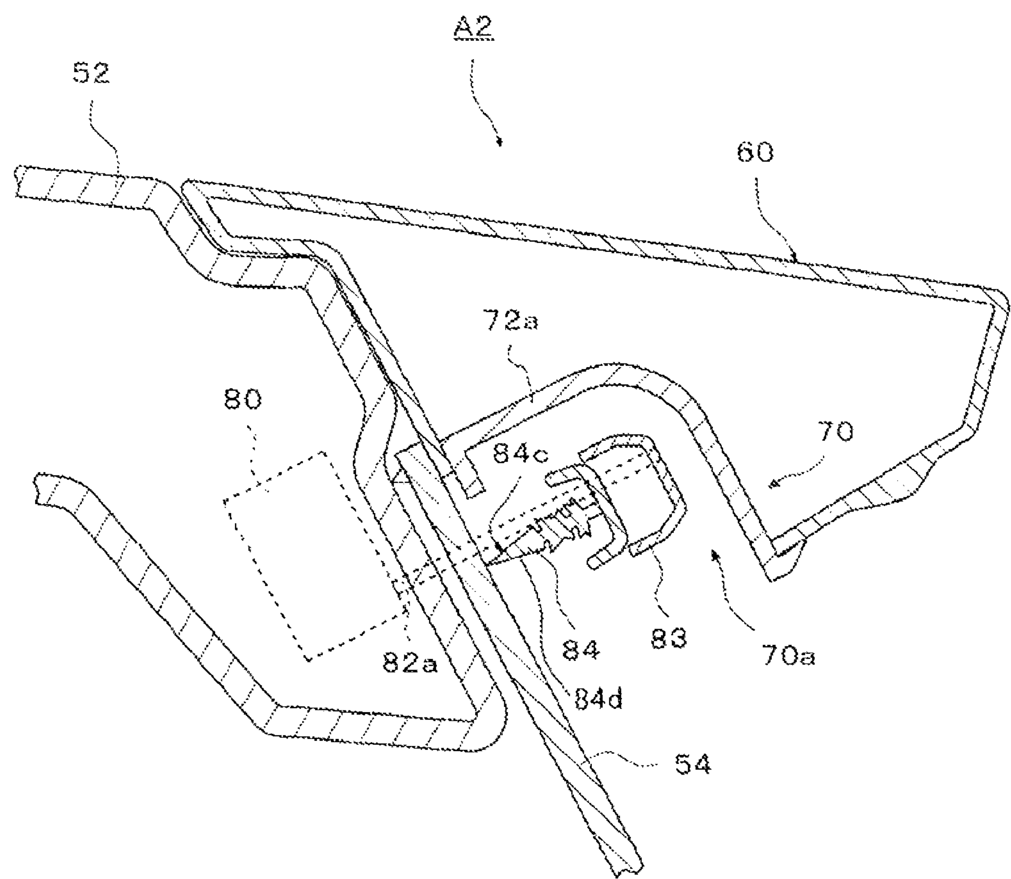
FIG. 8 is a cross sectional view of a wiper system and a vehicle according to a second embodiment of the present invention.

FIG. 8 is a cross sectional view of the vehicle and the wiper system according to the second embodiment, in which the wiper motor apparatus is installed in the vehicle side. In FIG. 8, the wiper motor apparatus 30 is indicated by a dotted line to ease the description.

As shown in FIG. 8, the wiper system A2 of the second embodiment is similar to that of the first embodiment and includes the spoiler (a spoiler main body 60 and a spoiler base 70) and the wiper (a wiper arm 83 and a wiper blade 84).

Similar to the first embodiment, a wiper accommodation space 70_a_ is provided in the spoiler base 70. A wiper blade 84 is accommodated in the wiper accommodation space 70_a_ at the stop position. At this time, a distance between an inner surface of a depth end wall 72_a_ of the wiper accommodation space 70_a_ and an opposed surface 84_c_ of a wiper strip 84_d_ of the wiper blade 84 is larger at the distal end side of the wiper strip 84_d_ of the wiper blade 84 than a pivot axis side of the wiper strip 84_d_ of the wiper blade 84 where a pivot axis of a pivot shaft 82_a_ is located.

In the present embodiment, the wiper motor apparatus 80, which rotates the wiper arm 83 and the wiper blade 84, is placed in a vehicle top side interior space of the back door 52. The pivot shaft 82*a* of the wiper motor apparatus 80 projects outside of the vehicle through a door outer panel plate and a glass 54 of the back door 52. Similar to the first embodiment, one end of the wiper arm 83 is installed to the pivot shaft 82*a*, and the wiper blade 84 is installed to the wiper arm 83.

When the pivot shaft 82*a* is driven by the wiper motor apparatus 80, the wiper arm 83 and the wiper blade 84 are reciprocally swung to wipe the window surface.

Even in this case where the wiper motor apparatus 80 is directly installed in the body of the vehicle instead of the spoiler, the effects and the advantages similar to those of the first embodiment can be achieved.

In the present embodiment, the pivot shaft 82*a* projects outside of the vehicle through both the door outer panel plate and the glass 54 of the back door 52. Alternatively, the pivot shaft 82*a* may be placed to project outside from the back door 52 at a location above the upper end of the glass 54, so that the pivot shaft 82*a* projects only through the door outer panel plate of the back door 52.

Third Embodiment

A third embodiment of the present invention will be described with reference to FIGS. 9A to 10.

In the following description of the third embodiment, components similar to those of the first embodiment will be indicated by the same reference numerals and will not be described further, and the differences, which differ from the first embodiment, will be mainly described.

In the present embodiment, only a wiper accommodation space 220*a* is different from that of the first embodiment.

Figure 9A:
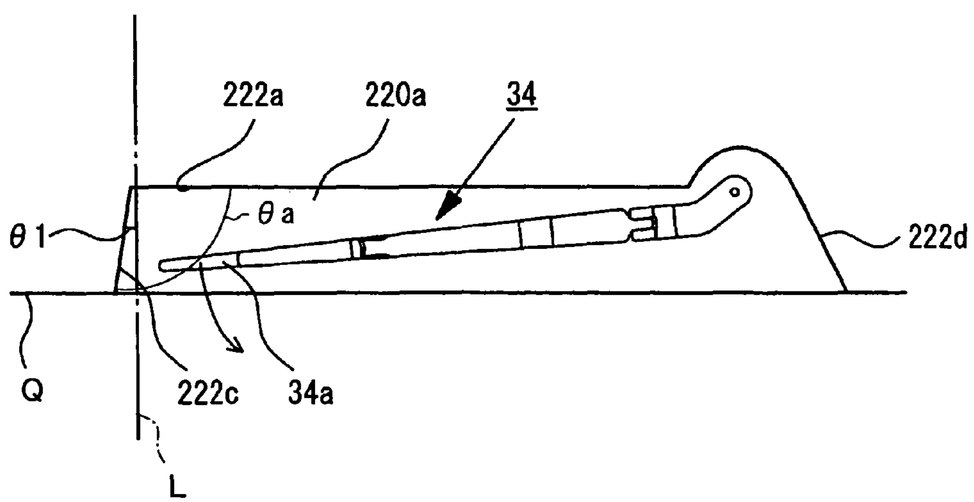
FIGS. 9A and 9B are descriptive views indicating a configuration of a wiper accommodation space of a wiper system according to a third embodiment of the present invention.
Figure 9B:
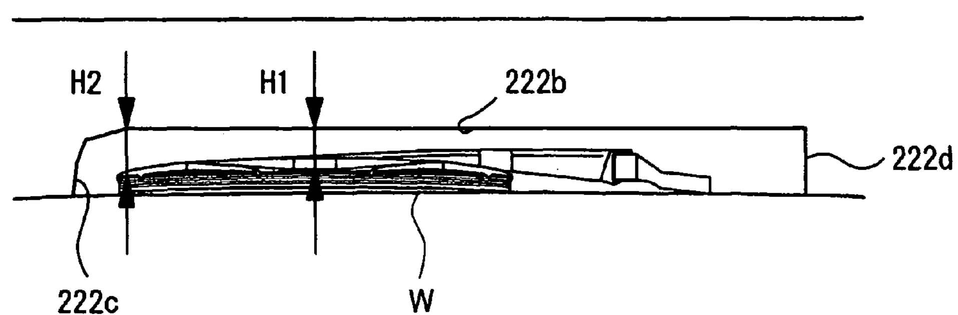

FIGS. 9A and 9B show the wiper accommodation space 220*a*.

FIG. 9A is a view of the wiper system A3 taken from the vehicle outer side (rear glass outer side) without a transverse wall 222*b*. FIG. 9B is a view of the wiper system A3 taken from an opening (an opening through which the wiper blade moves in and out during the operation) side of the wiper accommodation space 220*a* in the installed state of the wiper system A3.

Both of FIGS. 9A and 9B show only the main structure of the wiper system A3, and the other components are not shown for the sake of simplicity.

Furthermore, the wiper accommodation space 220*a* of the present embodiment is a space defined by a depth end wall 222*a*, the transverse wall 222*b*, a wall (hereinafter, referred to as a first lateral wall 222*c*), which closes the space 220*a* at the distal end side 34*a* of the wiper blade 34, and a wall (hereinafter referred to as a second lateral wall 222*d*), which closes the space 220*a* at the pivot axis side 34*b* of the wiper blade 34.

In the present embodiment, the depth end wall 222*a*, the transverse wall 222*b*, the first lateral wall 222*c* and the second lateral wall 222*d* are formed integrally in the spoiler to define the wiper accommodation space 220*a*.

Furthermore, a vertical line, which extends vertically downward from a connection (line of intersection) between the depth end wall 222*a* and the first lateral wall 222*c*, will be referred to as a vertical line L in FIG. 9A.

As shown in FIG. 9A, in the present embodiment, the first lateral wall 222*c* is progressively spaced from the distal end portion of the wiper blade 34 from the connection between the depth end wall 222*a* and the first lateral wall 222*c* toward the opening of the accommodation space 220*a*, which is indicated by the line Q.

Specifically, in the present embodiment, the first lateral wall 222*c* is formed to define a predetermined angle relative to the vertical line L in the direction away from the distal end portion of the wiper blade 34.

That is, the first lateral wall 222*c* is formed such that the angle $\theta 1$, which is defined between the vertical line L and the first lateral wall 222*c*, is in a range of $0 \text{ degree} \leqq \theta 1 < 90$ degrees. In other words, an end of the first lateral wall 222*c*, which is opposite from the depth end wall 222*a* in a direction generally parallel to the front-to-rear direction of the vehicle, is angularly displaced from the depth end wall 222*a* by an angle $\theta a$, which is 90 degrees or more.

Thus, the opening, which serves as the entry/exit opening of the wiper accommodation space 220*a* for the wiper blade 34, is widened, and the volume of the wiper accommodation space is increased toward the distal end side of the wiper blade 34.

Therefore, the volume of the wiper accommodation space 220*a* is increased, so that the relatively large amount of snow, which is wiped by the wiper blade 34, can be accumulated in the wiper accommodation space 220*a* at the time of relatively large snowfall. Therefore, it is possible to limit a damage of the wiper blade 34 and locking of the wiper motor apparatus 30 caused by the accumulated snow.

Also, the wiper blade 34 makes the reciprocal swing motion about the base end portion 33*a* along the arcuate path to wipe the wiping surface W. The length of the arcuate travel path (wiping path) of the wiper blade 34 is progressively increased from the base end portion 33*a* toward the distal end portion of the wiper blade 34, so that the wiping surface area size is accordingly progressively increased from the base end portion 33*a* toward the distal end portion of the wiper blade 34. Thus, the amount of the wiped object (e.g., the snow) is increased toward the distal end portion of the wiper blade 34.

In the wiper accommodation space 220*a* of the present embodiment, the volume is increased toward the distal end side of the wiper blade 34, so that it is possible to accumulate the relatively large amount of the wiped objects (e.g., the snow). Therefore, it is possible to further limit the damage of the wiper blade 34 and the locking of the wiper motor apparatus 30 caused by the accumulated snow.

Also, as shown in FIG. 9B, in the wiper accommodation space 220*a*, the distance between the transverse wall 222*b* and the wiper blade 34 (the distance between the transverse wall 222*b* and its opposed surface of the wiper blade 34) measured in the direction generally perpendicular to the surface of the glass 4 is set such that the distance H1 at the connection between the wiper arm 33 and the wiper blade 34 is smaller than the distance H2 at the distal end portion of the wiper blade 34 (i.e., H2>H1).

Therefore, the volume of the wiper accommodation space 220*a* is increased. More particularly, the volume of the portion of the wiper accommodation space 220*a*, which receives the distal end portion of the wiper blade 34, is increased. As a result, it is possible to further limit the damage of the wiper blade 34 and the locking of the wiper motor apparatus 30 caused by the accumulated snow.

Figure 10:
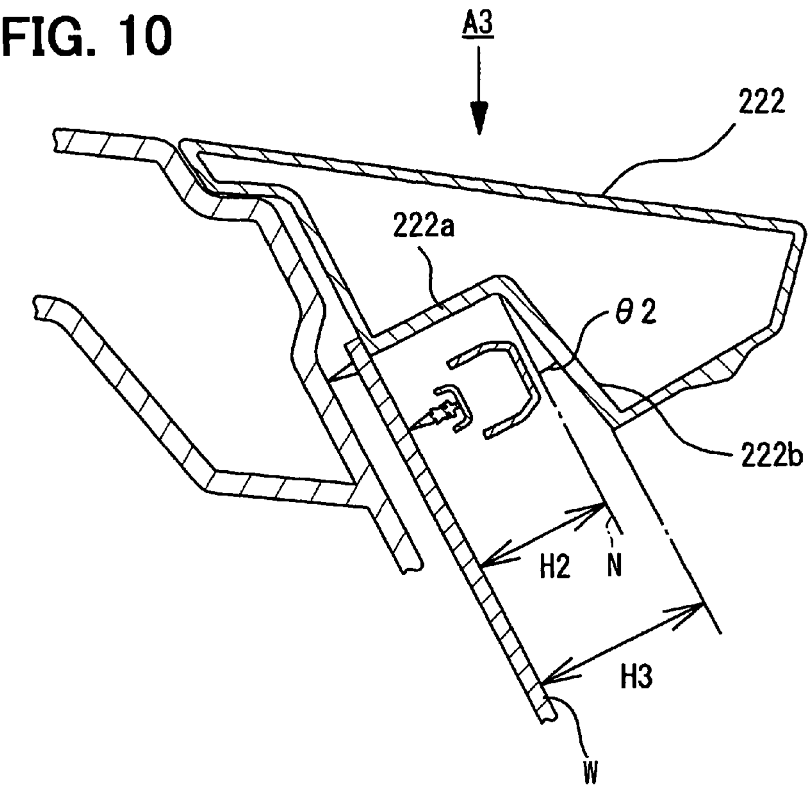
FIG. 10 is a cross sectional view of a wiper system and a vehicle according to a third embodiment of the present invention.
Figure 11:
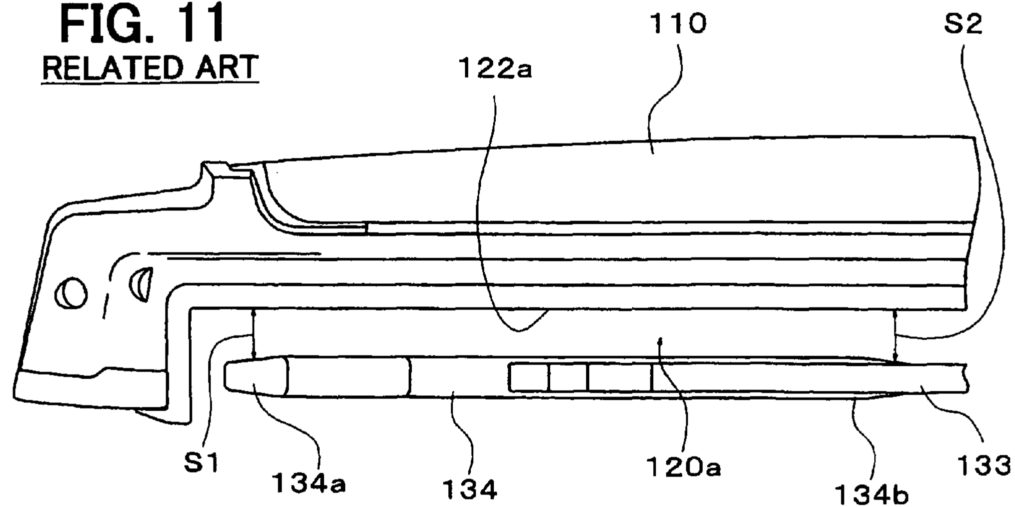
FIG. 11 is a descriptive view of a previously proposed wiper system.

Furthermore, as shown in FIG. 10, the transverse wall 222*b* is formed such that the wiping surface W and the transverse wall 222*b* define a predetermined angle $\theta 2$ (an angle of the transverse wall 222*b*, which extends from the connection between the transverse wall 222*b* and the depth end wall 222*a* in the direction away from the wiping surface, with respect to a parallel line N, which extends from the connection between the transverse wall 222*b* and the depth end wall 222*a* and is parallel with wiping surface W).

This angle θ2 is in a range of 0 degree≦θ2<90 degrees.

That is, the wiper accommodation space 220*a* is formed such that the distance between the transverse wall 222*b* and the wiping surface W is increased from the location around the depth end wall 222*a* toward the opening of the wiper accommodation space 220*a*.

In other words, in FIG. 10, the distance H2 between the transverse wall 222*b* and the wiping surface W at the depth end wall 22*a* is equal to or smaller than a distance H3 between the transverse wall 222*b* and the wiping surface W at the opening of the wiper accommodation space 220*a* (i.e., H2≦H3).

In the present embodiment, the wiper accommodation space 220*a* is defined by the spoiler main body 222 alone (i.e., without the structure that forms the spoiler base). That is, the depth end wall 222*a*, the transverse wall 222*b*, the first lateral wall 222*c* and the second lateral wall 222*d*, which define the wiper accommodation space 220*a*, are formed as the part of the spoiler main body 222.

With the above construction, the volume of the wiper accommodation space 220*a* is increased, so that the relatively large amount of snow, which is wiped by the wiper blade 34, can be accumulated in the wiper accommodation space 220*a* at the time of a relatively large snowfall. Therefore, it is possible to limit a damage of the wiper blade 34 and locking of the wiper motor apparatus 30 caused by the accumulated snow.

Next, modifications of the above embodiments will be described.

In the above embodiments, it is determined whether the wiper blade 34 is in the preset stop position based on the rotational position, which is sensed with the rotation output device 31*b* installed to the output shaft 31*a*. Then, based on this determination, the stop position of the wiper blade 34 is electrically controlled. However, the way of stopping the wiper blade 34 at the preset stop position, at which the wiper blade 34 is tilted relative to the horizontal direction, is not limited to the above electrical method. For example, a limit member (a stop member) may be placed in the wiper accommodation space 20*a* at the side where the pivot shaft 32*a* is located. The limit member contacts an opposed wall surface of the wiper arm 33, which is opposed to the depth end wall 22*a*, to limit the movement of the wiper arm 33, so that the wiper blade 34 is mechanically stopped by the limit member in the tilted state.

Furthermore, the preset stop position, which is preset in the stop position setting arrangement 35*a*, may be non-adjustably fixed or may be adjustable depending on the vehicle state. For example, in the case of the relatively large snowfall, the tilt angle of the wiper blade 34 relative to the horizontal direction may be increased to increase the distance S between the depth end wall 22*a* of the wiper accommodation space 20*a* and the opposed surface 34*c* of the wiper blade 34, to increase the space for accumulating the snow. Therefore, the relatively large amount of snow, which is wiped by the wiper blade 34, can be accumulated in the wiper accommodation space 20*a* at the time of the relatively large snowfall. Therefore, it is possible to limit the damage of the wiper blade 34 and the locking of the wiper motor apparatus 30 caused by the accumulated snow.

In contrast, in the case of relatively small snowfall or no snowfall, the tilt angle of the wiper blade 34 relative to the horizontal direction may be reduced. In this way, the distal end side 34*a* of the wiper blade 34 is not exposed when the wiper system A is seen from the outside, so that the appearance of the wiper system A can be improved.

Additional advantages and modifications will readily occur to those skilled in the art. The invention in its broader terms is therefore not limited to the specific details, representative apparatus, and illustrative examples shown and described. For example, one or more components of any one of the first to third embodiments may be combined with one or more components of any other one of the first to third embodiments in any appropriate manner.

What is claimed is:

1. A wiper system for a vehicle, comprising:

a wiper blade that is reciprocally pivotable about a pivot axis thereof and includes a wiper strip, which is adapted to contact and wipe a surface of a window glass of the vehicle; and a spoiler that projects from a surface of a body of the vehicle and has an accommodation space, which accommodates the wiper blade upon positioning of the wiper blade in a stop position, wherein:

the spoiler includes a depth end wall, which bounds the accommodation space and has an inner surface exposed to the accommodation space;

the depth end wall protrudes in a direction generally perpendicular to the surface of the window glass;

the accommodation space has an opening on a side, which is opposite from the depth end wall in a direction generally parallel to a front-to-rear direction of the vehicle, to move the wiper blade into and out of the accommodation space; and a distance between the inner surface of the depth end wall and the wiper strip of the wiper blade in the stop position measured in a direction generally parallel to the surface of the window glass is set such that the distance between the inner surface of the depth end wall and a first longitudinal side of the wiper strip of the wiper blade, which is opposite from the pivot axis, is larger than the distance between the inner surface of the depth end wall and a second longitudinal side of the wiper strip of the wiper blade, which is opposite from the first longitudinal side of the wiper strip of the wiper blade.

2. The wiper system according to claim 1, wherein the accommodation space is defined by:

a transverse wall that is opposed to the surface of the window glass in the direction generally perpendicular to the surface of the window glass and extends in a direction generally parallel to a transverse direction of the vehicle, which is perpendicular to the front-to-rear direction of the vehicle;

the depth end wall that extends downward to the surface of the window glass from one side of the transverse wall, which is closer to a top end of the window glass than the other side of the transverse wall;

a first lateral wall that extends downward to the surface of the window glass from the transverse wall and closes a first lateral side of the accommodation space, which is adjacent to the first longitudinal side of the wiper strip of the wiper blade in the stop position; and a second lateral wall that is opposed to the first lateral wall in a direction generally parallel to the transverse direction of the vehicle and extends downward to the surface of the window glass from the transverse wall, so that the second lateral wall closes a second lateral side of the accommodation space, which is adjacent to the second longitudinal side of the wiper strip of the wiper blade in the stop position, wherein the transverse wall, the first lateral wall and the second lateral wall are formed integrally in the spoiler to define the accommodation space.

3. The wiper system according to claim 2, wherein a distance, which is measured between the transverse wall and the wiper strip of the wiper blade in the direction generally perpendicular to the surface of the window glass, is set such that the distance at the first longitudinal side of the wiper strip of the wiper blade is larger than the distance at the second longitudinal side.

4. The wiper system according to claim 3, wherein an end of the first lateral wall, which is opposite from the depth end wall in a direction generally parallel to the front-to-rear direction of the vehicle, is angularly displaced from the depth end wall by 90 degrees or more.

5. The wiper system according to claim 4, wherein a height of the opening, which is measured in the direction generally perpendicular to the surface of the window glass, is equal to or larger than a height of the depth end wall, which is measured in the direction generally perpendicular to the surface of the window glass.

6. The wiper system according to claim 1, wherein the distance between the inner surface of the depth end wall and the wiper strip of the wiper blade linearly increases from the second longitudinal side of the wiper strip of the wiper blade toward the first longitudinal side of the wiper strip of the wiper blade upon positioning of the wiper blade in the stop position.

7. The wiper system according to claim 1, wherein the distance between the inner surface of the depth end wall and the wiper strip of the wiper blade increases along a length of the wiper strip of the wiper blade in conformity with an increase in a length of an arcuate wiping path of the wiper strip of the wiper blade along the length of the wiper strip of the wiper blade.

8. The wiper system according to claim 1, wherein the wiper blade is tilted in the stop position such that the first longitudinal side of the wiper strip of the wiper blade is directed downward relative to a horizontal direction.

9. The wiper system according to claim 8, wherein:

a printed portion is formed on the window glass at a location adjacent to the wiper system to cover an outer peripheral portion of the window glass; and a longitudinal end of the first longitudinal side, which is opposite from the second longitudinal side, is placed above a lower end of the printed portion when the wiper blade is placed in the stop position.

10. The wiper system according to claim 9, wherein the longitudinal end of the first longitudinal side, which is opposite from the second longitudinal side, is placed above a lower end of the opening of the accommodation space when the wiper blade is placed in the stop position.

11. The wiper system according to claim 1, further comprising a wiper motor apparatus, which is installed in the spoiler and provides a drive force to the wiper blade to reciprocally pivot the wiper blade.

12. The wiper system according to claim 1, further comprising a wiper motor apparatus, which is spaced from the spoiler and is installed in the body of the vehicle, wherein the wiper motor apparatus provides a drive force to the wiper blade to reciprocally pivot the wiper blade.

* * * * *